United States Patent

[11] 3,587,235

[72] Inventors Raymon L. Goff; Charles V. Gagen, both of Lafayette, Ind.
[21] Appl. No. 829,493
[22] Filed June 2, 1969
[45] Patented June 28, 1971
[73] Assignee TRW Inc., Cleveland, Ohio

[54] REGENERATIVE HYDROSTATIC STEERING SYSTEM
10 Claims, 3 Drawing Figs.

[52] U.S. Cl............................................. 60/52, 180/79.2, 91/436
[51] Int. Cl......................................... F15b 15/18, B62d 5/00
[50] Field of Search............................ 60/525; 180/79.2 (Inquired); 91/436, 437, (Inquired)

[56] References Cited
UNITED STATES PATENTS

| | | | |
|---|---|---|---|
| 1,909,166 | 5/1933 | Burrell | 60/52 |
| 3,059,717 | 10/1962 | Moyer et al. | 60/52SX |
| 3,159,084 | 12/1964 | Zeigler et al. | 60/52SX |
| 3,385,057 | 5/1968 | Pruvot et al. | 60/52S |
| 3,443,378 | 5/1969 | Monroe et al. | 60/52S |
| 3,470,758 | 10/1969 | Liebert | 60/52SX |
| 3,497,032 | 2/1970 | Schott | 60/52SX |

Primary Examiner—Edgar W. Geoghegan
Attorney—Hill, Sherman, Meroni, Gross and Simpson ABSTRACT: A hydraulic power steering system including a one-piece hydrostatic unit connected to a main power fluid pump assembly and employing an axially shiftable directional control sleeve valve and a single hydraulic work cylinder connected to the hydrostatic unit. The free cross-sectional area on one side of the piston of the work cylinder is twice that of the other side. The hydrostatic unit includes a manually controlled operating shaft which, when turned in one direction, is effective to shift the sleeve valve axially in one direction, thereby causing all the fluid being pumped from the main pump assembly to the hydrostatic unit, as well as all the fluid being expelled from the reduced area end of the work cylinder, to enter the increased area end of the work cylinder. When the operating shaft is turned in an opposite direction the sleeve valve is shifted axially in an opposite direction, thereby causing all the fluid from the main pump assemble to enter the reduced area end of the work cylinder and the fluid being expelled from the increased area end to return to the main pump assembly.

INVENTORS
RAYMON L. GOFF
CHARLES V. GAGEN

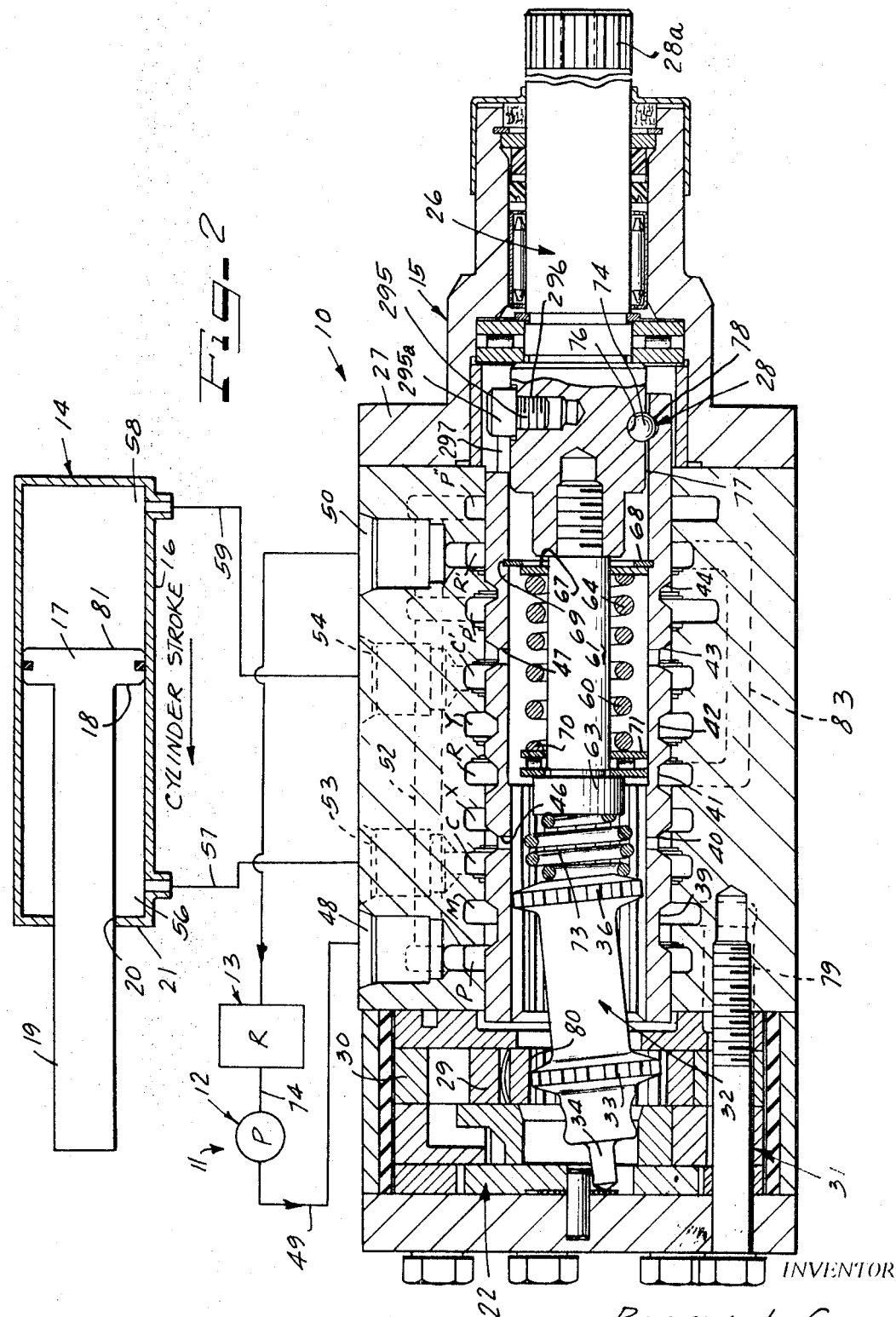

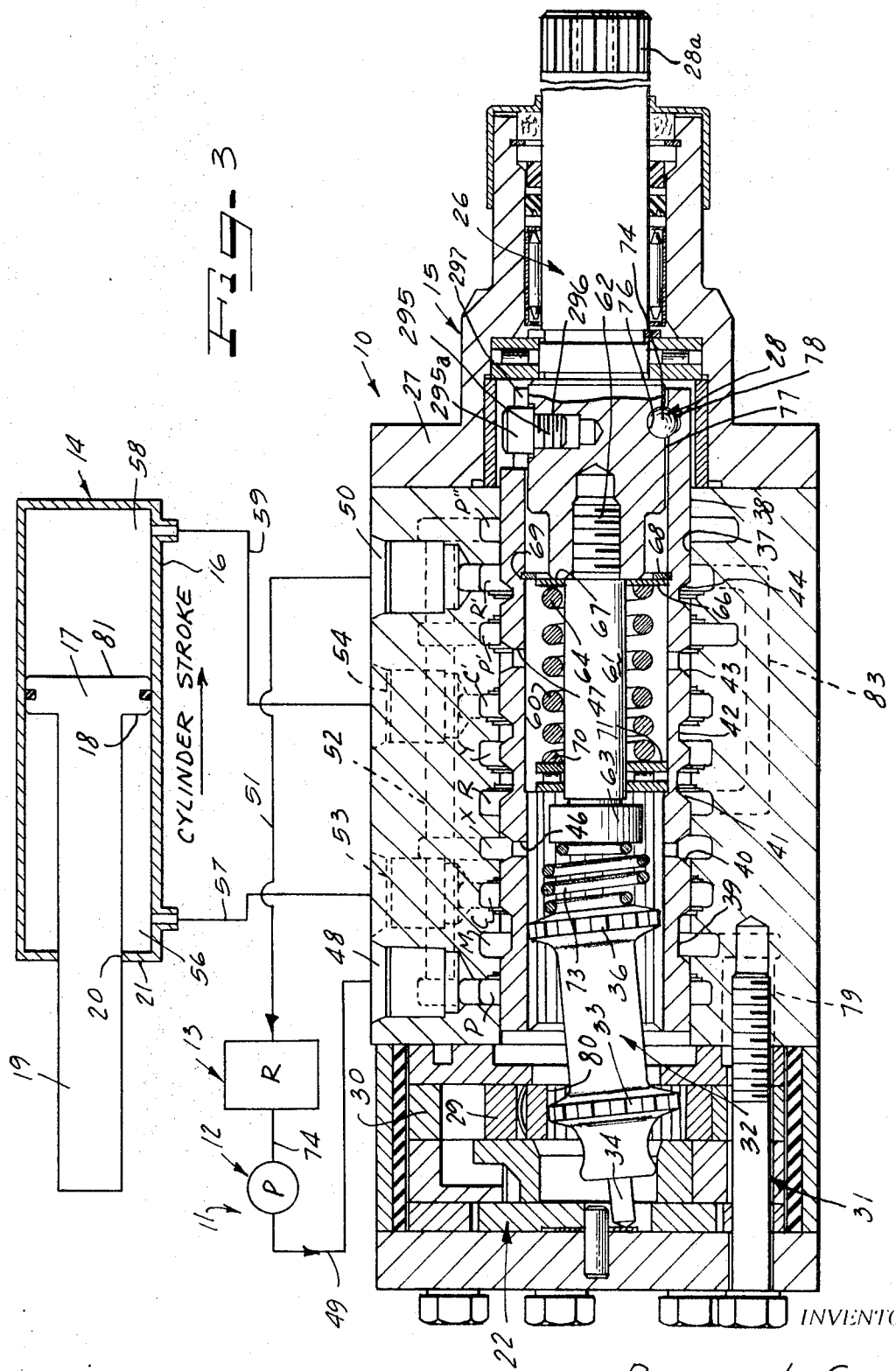

REGENERATIVE HYDROSTATIC STEERING SYSTEM

BACKGROUND OF THE INVENTION

This invention relates generally to the field of servo systems and more particularly to hydraulically operated servo systems which employ a single hydraulic work cylinder.

The present invention is described herein in relation to vehicular power steering systems, an application for which it is particularly well suited. Other applications of the invention will become readily apparent to those skilled in the art, however, and its possible uses extend to all in which hydraulically operated servo systems are being or can be advantageously utilized.

In hydraulic power steering systems the mechanical steering linkage which controls the steering angle of the dirigible wheels is operated by a hydraulic cylinder which may be conveniently referred to as the work cylinder. In some systems a "double" or balanced area hydraulic cylinder arrangement is used, that is, a single cylinder having piston rods extending from both sides of the piston or a pair of cylinders arranged in tandem both of which have a piston rod extending from only one side of the piston thereof. In either of these double hydraulic cylinder arrangements the amount of pressurized fluid being delivered to one side of the work cylinder or cylinders during a wheel turning operation equals the amount of fluid being expelled from the other side, assuming the cross-sectional area of the piston rods to be equal and the inner cross-sectional areas of the cylinders, if more than one are used, to be equal also. This equalization of fluid flow to and from the work cylinder arrangement during a turning operation results in a balanced or symmetrical application of forces in both steering directions due to equal fluid flow velocities and equal mechanical force ratios.

In some hydraulic power steering applications, however, it is desirable, generally for economic reasons, to utilize a "single" hydraulic cylinder arrangement, that is, a single cylinder having a piston rod extending from only one side of the piston. Single hydraulic cylinder arrangements, because of reduced cost factors, are often employed in applications in which cost is an important consideration.

In single cylinder arrangements, however, the amount of fluid being delivered to one end of the cylinder as the dirigible wheels are being turned is different from the amount being expelled from the other end. This fact per se can have the negative effect of producing an imbalance in or asymmetrical application of the steering forces in the opposite directions of steering.

The present invention overcomes or reduces many of the operating problems and disadvantages otherwise inherent in single cylinder arrangements providing a more balanced application of steering forces, a closer relationship between fluid velocities and a greater equalization of mechanical steering force ratios in both directions of steering.

SUMMARY OF THE INVENTION

The present invention may be summarized as comprising a hydraulic servomechanism applicable to vehicular power steering or similar servosystems including a one-piece manually controlled hydrostatic unit adapted for connection to a main power fluid pump assembly and a single hydraulic work cylinder arrangement wherein the cross-sectional area of the piston rod is one-half the inner cross-sectional area of the cylinder and in which the valve mechanism in the hydrostatic unit for controlling the direction of fluid to and from the work cylinder comprises an axially shiftable sleeve valve which is capable in one direction of steering, of delivering to the work cylinder fluid being pumped to the hydrostatic unit by the pump assembly while returning none of the fluid to the pump assembly, and in the opposite direction of steering, of delivering to the work cylinder fluid being pumped to the hydrostatic unit by the pump assembly while returning twice that amount to the pump assembly.

An object of the present invention is to provide improved steering capability in single cylinder systems, which object is achieved by the novel constructions and arrangements herein disclosed including the axially shiftable directional control valve which reduces fluid pressure losses within the hydrostatic unit while increasing the control of the rate of fluid flow therein in both directions of steering, and thus provides a more balanced application of steering forces, a closer relationship between fluid velocities and a greater equalization of mechanical steering ratios.

Many other features, advantages and additional objects of the present invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWING

FIG. 2 is similar to FIG. 1 but shows the directional control valve in a first operating position.

FIG. 3 is similar to FIG. 1 but shows the directional control valve in a second operating position.

DESCRIPTION OF THE PREFERRED EMBODIMENT

Figure 1:
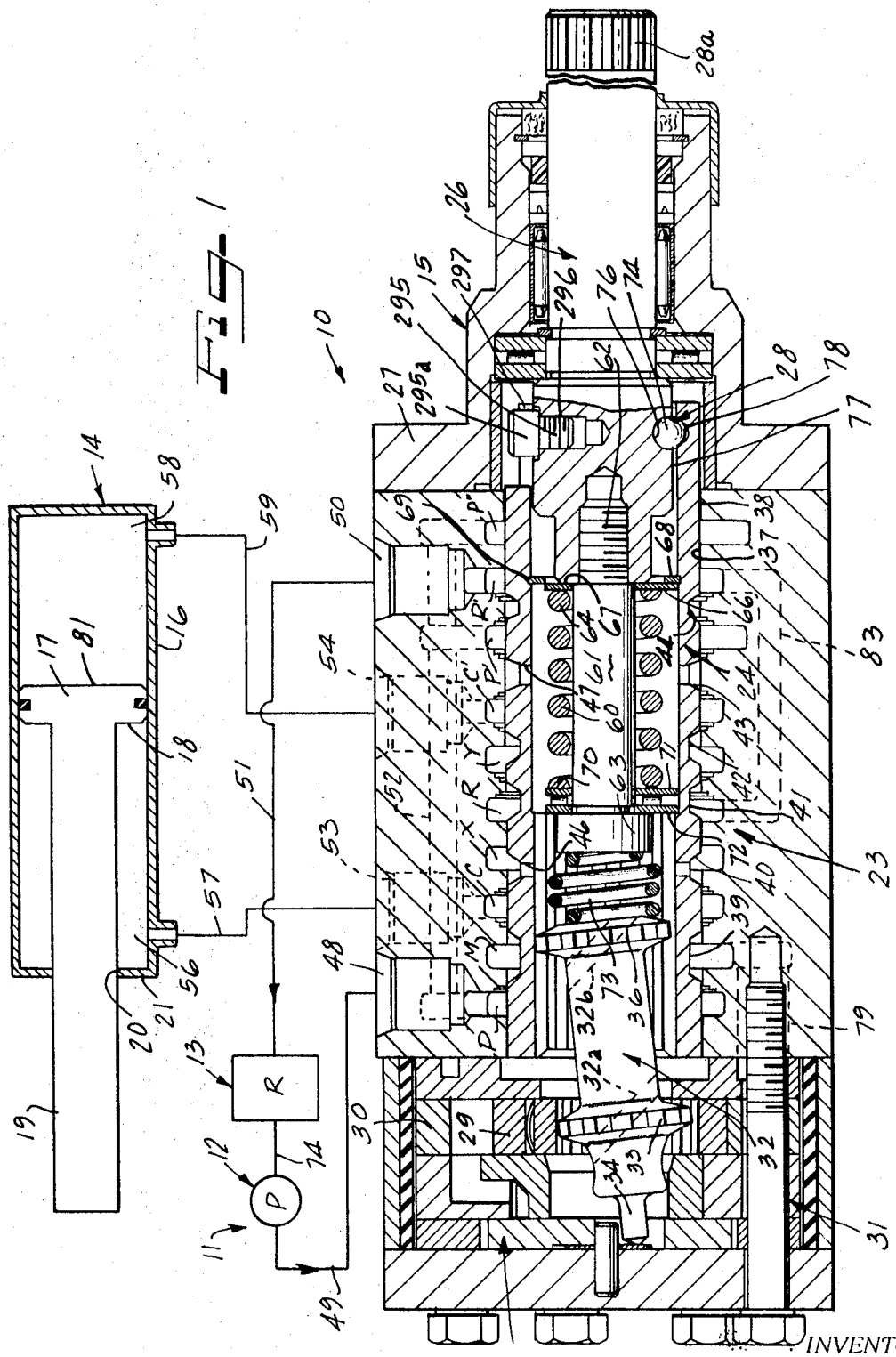
FIG. 1 is illustrative of a hydraulic servosystem constructed in accordance with the principles of the present invention and suitable for use in vehicular power steering application. The FIG. is largely schematic in representation except for the hydrostatic unit which is shown in vertical cross section with an axially shiftable fluid directional control valve thereof disposed in a neutral position.

Referring to the drawing a hydraulic servosystem suitable for application in steering the dirigible wheels of a vehicle and constructed in accordance with the principles of the present invention is indicated generally at reference numeral 10. Briefly, the system 10 comprises a main power fluid pump assembly 11 including a fluid pump 12 and fluid reservoir 13 connected thereto, a single hydraulic work cylinder 14 and a hand-operated hydrostatic unit 15.

As applied to the field of vehicular steering the pump 12 may be driven by the main engine of the vehicle. This arrangement is generally preferred, for reasons of reduction in cost, economy in operation and reduction in space requirements, to arrangements involving a separate driving motor for the pump even though it is appreciated that operation of the pump ceases when operation of the vehicle engine ceases, having the effect of eliminating the power steering capability of the system 10.

The hydraulic cylinder assembly 14 includes a pressure cylinder 16 having slidably carried therewithin a piston 17 from one side 18 of which extends a piston rod 19 through an aperture 20 formed in an end wall 21 of the cylinder 16. The piston rod 19 may conveniently be connected directly to the mechanical steering linkage which controls the angle of steering of the dirigible wheels of the vehicle.

The hydrostatic unit 15, under power steering conditions, performs two basic functions: (1) by means of a gear assembly indicated generally at reference numeral 22 it meters or controls the flow rate of fluid to and from the hydraulic cylinder 14 and (2 by means of a valving arrangement indicated generally at reference numeral 23 and including an axially shiftable sleeve valve 24 it controls the direction of the flow of fluid to and from the cylinder assembly 14 and thus regulates the direction of movement of the piston 17 and piston rod 19 and thus the direction of steering of the dirigible wheels of the vehicle.

The directional control valve 24 is axially shiftable from a center or neutral position, the position in which it appears in FIG. 1 and at which the flow of pressurized fluid from the pump 12 to the cylinder arrangement 14 is effectively blocked, to either of two operating positions illustrated respectively in FIGS. 2 and 3 and at which the pump 12 is effectively connected to one or the two ends of the cylinder 16 to move the piston 17 accordingly.

Directional control valve 24 is shifted axially in response to rotation of an operating or control shaft 26 which is journaled on a housing 27 of the hydrostatic unit 15. The operating shaft 26 is connected to the directional control valve 24 through a spherical ball and a helical groove arrangement indicated generally at reference numeral 28 and is adapted at an outer end 28a to receive suitable means for facilitating the rotation thereof, such as a hand-operated vehicular steering wheel.

The gear assembly 22 preferably comprises a pair of gears 29 and 30 which may be conveniently referred to as a rotor and stator. The stator 30 is internally toothed and the rotor 29 which is internally toothed resides within the stator 30. The rotor 29 has one tooth less than the stator 30 and is constructed and arranged so that upon rotation of the rotor 29 it not only rotates about its own axis but also orbits about the central axis of the stator 30, and in doing so, forms alternately expanding and contracting fluid pockets or chambers between the teeth thereof and the teeth of the stator 30. Furthermore, the rotor 29 orbits about the axis of the stator 30 $n$ times for each revolution thereof about its own axis, $n$ being equal to the number of teeth of the rotor 29.

The gear assembly 22 also includes a fluid commutator assembly 31 which is operatively associated with the gears 29 and 30 and is operated in synchronism therewith to direct fluid into and out of the expanding and contracting fluid pockets or chambers in timed relation to the rotational and orbital movement of the rotor 29.

The gear assembly 22 is illustrated and described in detail in pending application of Raymon L. Goff and Hollis N. White, Jr. entitled "HYDROSTATIC DEVICE," Ser. No. 680,934, filed Nov. 6, 1967, now U.S. Pat. No. 3,452,543 issued July 1, 1969 and since the details thereof form no part of the present invention, further description thereof is omitted in the interest of clarity and brevity.

The fluid commutator assembly 31 is driven in synchronism with the rotor and stator 29 and 30 by virtue of a wobble shaft 32 which comprises an elongated generally cylindrical member splined at one portion 33 for joint rotation with the rotor 29 and having a finger 34 extending axially therefrom which orbits at the orbit speed of the rotor 29 and which drives a rotating fluid commutator valve at the orbit speed of the rotor.

Another portion 36 of the wobble shaft 32 is also splined for joint rotation with the directional control valve 24 which is carried within a cylindrical bore 37 formed in the housing 27. Thus the directional control valve 24 rotates at the rotational speed of the rotor 29, whereas the commutator assembly 31 performs its commutation function at the orbital speed of the rotor 29.

In performing its function of controlling the direction of fluid to and from the hydraulic cylinder 16 the directional control valve 24 selectively connects and disconnects various axially spaced circumferentially continuous grooves formed in the wall of the bore 37 and identified respectively at reference characters P, M, C, X, R, Y, C', P', R' and P''. To perform this function the valve 24 has formed in a peripheral wall 38 thereof a series of axially spaced circumferential grooves indicated at reference numerals 39—44. A series of radially angularly spaced apertures 46 extend radially through the valve 24 to communicate the groove 40 with the interior of valve 24 and a second series of angularly spaced apertures 47 communicate groove 43 with the interior of the directional control valve 24. The grooves 40 and 43 may thus conveniently be referred to as radial flow passages.

Also formed in the hydrostatic unit 15 is a main fluid inlet port 48 adapted for connection to the discharge side of pump 12 through a conduit 49 and main fluid outlet 50 connected to the reservoir 13 by means of a conduit 51. Groove P is in direct communication with the main fluid inlet 48 and grooves P' and P'' communicate therewith through an internal passage 52 formed in the housing 27. Another pair of ports 53 and 54 are also formed in the housing 27 and communicate respectively with the grooves C and C'. In addition port 53 is adapted for connection to one end 56 of the cylinder 16 through conduit 57 and the other port 54 is connected to an opposite end 58 of the cylinder 16 via conduit 59.

The cross-sectional area of the piston rod 19 is one-half the cross-sectional area of the interior of the cylinder 16. Assuming, therefore, that both ends 56 and 58 of the cylinder 16 are filled with fluid and the piston 17 is moved rightwardly as viewed in FIG. 1 the flow rate of fluid being expelled from end 58 is equal to twice the flow rate of the fluid entering end 56. Conversely, if the piston 17 is moved leftwardly the flow rate of the fluid entering cylinder end 58 is equal to twice the flow rate of the fluid being expelled from the cylinder end 56.

The directional control valve 24 is biased to the neutral position thereof shown in FIG. 1 by means of a coil spring 60 which is wound about a shaft 61 threaded at one end 62 into the main body of the operating shaft 26 and which has an enlarged head portion 63 formed at the opposite end thereof. One end 64 of the spring 60 is bottomed on an annular ring or washer 66 carried on the shaft 61. In the position thereof shown in FIG. 1 the washer 66 abuts a radial shoulder 67 formed on the operating shaft 26 and also abuts another annular washer 68 snap-fit in a circumferential groove 69 formed in an inner wall 65 of the directional control valve 24 and axially movable therewith.

An opposite end 70 of the spring 60 is bottomed on a washer-bearing assembly 71 which, in the position thereof shown in FIG. 1, abuts a radial shoulder 72 formed on inner wall 65. The enlarged end 63 of the shaft 61 and the adjacent end 36 of the wobble shaft 32 are maintained in spaced relation by means of a spring member 73.

In the neutral position of the directional control valve 24 shown in FIG. 1, the pressurized fluid being delivered from the discharge side of the pump 12 flows through the circumferential groove P', groove 44 and thence to groove R', from which it flows through the main fluid outlet 50 and the conduit 51 to the reservoir 13 which, in turn, is connected to the suction or low pressure side of the pump 12 through a conduit 74. None of the pumped fluid flows through the circumferential grooves C and C', which two grooves, since they are connected to the opposite ends of the hydraulic cylinder 16, may be conveniently referred to as cylinder grooves or ports.

To assist in the description of the operation of the system 10 assume that the operating shaft 26 is rotated in a clockwise direction. The ball and groove arrangement 28, which comprises a spherical member 74 carried in a complementarily shaped recess 76 formed in a peripheral wall 77 and riding in a helical groove 78 formed in the bore wall 37, causes the directional control valve 24 to shift leftwardly to the position thereof shown in FIG. 2. This axial shifting of the valve 24 is due to its inability to rotate in the neutral position thereof. The valve cannot rotate in this position since it is connected for joint rotation with the rotor 29 which is immobilized due to blockage in the internal hydraulic circuitry to and from the gear assembly 22. After the directional control valve 24 has shifted leftwardly to the operating position thereof shown in FIG. 2, the pressurized fluid from the pump 12 flows through the main inlet port 48, into the groove P, thence through groove 39 into groove M. From the groove M the fluid flows through passage 79 to the gear assembly 22, causing the rotor 29 to both rotate and orbit with respect to the stator 30.

The fluid then flows from the gear assembly 22 through passages 32a and 32b formed in the wobble shaft 32 and through a central bore 80 which is formed in the rotor 29 and which is splined complementarily to the splined portion 33 of the wobble shaft 32.

The fluid then flows into the interior of the directional control valve 24 from whence it flows through radial passages 46 and 47 into grooves 40 and 43. The grooves 40 and 43 are positioned to communicate respectively with the cylinder grooves C and C' which in turn are in communication with the opposite ends 56 and 58 of the hydraulic cylinder 16.

Since the fluid pressure across the piston 17 is equalized (both grooves or ports C and C' being in direct communication with each other and both being at substantially the same fluid pressure) and since the motive area of one side 81 of the piston 17 in communication with cylinder end 58 is twice that of the opposite side 18 which communicates with cylinder end 56 the piston 17 is urged leftwardly, the effect of which is to move the angle of steering of the dirigible wheels through the piston rod 19 accordingly.

As the rotor 29 orbits and rotates it turns the directional control valve 24 in the same direction in which the operating shaft 26 is being turned. Thus the movement of the directional control valve 24 "follows-up" the movement of the operating shaft 26 and so long as the angular displacement between the valve 24 and the shaft 26 which was necessary to shift the valve 24 leftwardly is maintained the valve will be maintained in the leftward operating position shown in FIG. 2. Thus so long as the shaft 26 continues to turn clockwise the piston 17 and the piston rod 19 will continue to move leftwardly. The return groove R' is blocked by the control valve 24, thus precluding fluid flow back to the reservoir R. Since the flow rate of the fluid being expelled from the cylinder end 56 is equal to one-half the flow rate of the fluid entering the cylinder end 58, one-half the fluid flow into the cylinder end 58 is due to fluid derivable from the pump P and the other half is due to the fluid being expelled from the cylinder end 56, passing through the hollow of the valve 24 and into the cylinder end 58 via groove C, aperture 46, aperture 47 and groove C'.

When clockwise rotation of the operating shaft 26 ceases the gear assembly 22 continues to operate until the rotor 29 has turned the directional control valve 24 relative to the shaft 26 to cause the valve 24 to shift axially rightwardly back to substantially the neutral position thereof shown in FIG. 1. Since the grooves in the bore wall 37 are then blocked with the exception of grooves P' and R' through groove 44, leftward movement of the piston 17 immediately ceases along with movement of the dirigible wheels of the vehicle. Although the valve 24 is moved "substantially" back to the neutral position thereof it is apparent that it is not moved fully thereto since movement ceases just as soon as the fluid flow through grooves in the valve are blocked. The "neutral" position of the valve, however, is slightly beyond this position and is in fact the position of the valve which obtains when it must move the same distance therefrom in one direction to "open" the flow through grooves as in the other direction to move to the other operating position.

The spring 60 is a valve centering element to return the valve to a fully neutral position after the grooves C and C' have been fully closed. When the directional control valve 24 was shifted leftwardly the washer 68 also moved leftwardly, thus compressing the spring 60. After rotation of the operating shaft has ceased and the valve 24 has shifted to close grooves C and C' the bias of spring 60 urges the valve 24 slightly further in a rightward direction to the full center or neutral position thereof.

Assume next that the operating shaft 26 is turned in a counterclockwise direction. The directional control valve 24 is then shifted from its neutral position rightwardly to the position thereof shown in FIG. 3, at which the circumferential groove P' is aligned with the radial passage 47 through the valve 24. The pressurized fluid flows through the hollow of the valve 24, then through the aperture 80 formed in the rotor 29, then through the commutator assembly 31 and into the expanding ones of the fluid pockets formed between the teeth of the rotor 29 and the stator 30. The pressurization of these chambers causes the rotor 29 to rotate and orbit with respect to the stator 30 but in directions opposite the directions of rotation and orbital movement in which the stator 29 moved when the valve was shifted to the left operating position thereof shown in FIG. 2.

The fluid is discharged from the contracting pockets of the gear assembly 22 and then discharged through the commutator assembly 31 and the passage 79 and into the groove M, from which it is transported into the cylinder port or groove C and thence to the left end 56 of the hydraulic work cylinder 16.

The piston 17 is thereby caused to move rightwardly, thereby expelling the fluid in the right hand 58 of the cylinder 16 through the conduit 29 and into groove C', from which it flows through groove 42, groove Y, groove 41 and into groove R, from which it is conveyed through a passage 83 formed in the housing 27 to groove R'. The fluid then flows from the main fluid outlet 50 through conduit 51 to the reservoir 13 of the main power fluid pump assembly 11.

The flow rate of the fluid being expelled from the right end 58 of the cylinder 16 is twice the flow rate of the fluid entering the left end 56. Consequently the amount of fluid being returned to the reservoir R is twice the amount of fluid being pumped by the main fluid pump 12. In this sense the steering system of the present invention may be referred to as "regenerative,"c since the total quantity of fluid contained within the main fluid pump assembly 11 is always constant in the center position of the piston 17 within the cylinder 16, even though the amount of fluid in the assembly 11 falls in one direction of steering. The amount rises again when the system is operated in an opposite direction of steering.

Meanwhile the rotor 29 rotates the directional control valve 24 in a counterclockwise direction to "follow-up" the movement of the operating shaft 26. So long as the operating shaft 26 is being turned the directional control valve 24 will be maintained in an angularly offset relation with the operating shaft to continue to direct fluid into the left end 56 of the hydraulic cylinder 16 and to permit fluid to be expelled from the right end 58 back to the reservoir R.

Once again when rotation of the operating shaft 26 ceases the rotation of the directional control valve 24 will continue, as a result of its driven relation with the rotor 29, until the valve 24 has shifted axially leftwardly substantially to the full neutral or center position thereof as shown in FIG. 1. Once the passages to and from the cylinder 16 have been closed by the valve 24 and rotation of the rotor 29 ceases, the valve 24 will be shifted by the spring 60 back to the full neutral position thereof.

The arrangement of the circumferential grooves formed in the bore wall 37 and in the axially shiftable directional control valve provide an exceptional porting arrangement which substantially improves the operation of the system 10. Because of the nature of the grooves in that they extend primarily circumferentially rather than axially, very slight axial movement of the valve 24 is sufficient to provide relatively high variations in the open flow areas in the grooves. This not only increases the rate of response of the system 10 but also increases the efficiency thereof by reducing fluid pressure losses within the hydrostatic unit 15.

In addition, however, very close control under normal straight-head driving conditions is not impaired since the circumferential groove arrangement also lends itself to smooth operation even when the fluid flow through grooves are merely "cracked" or opened only slightly, a condition that generally obtains under normal straight-ahead driving conditions.

The novel arrangement of the circumferential grooves is effective, in one direction of steering, to direct the full flow of fluid from the main pump 12 into the greater cross-sectional free area cylinder end 58 and to direct the fluid being expelled from the reduced cross-sectional free area cylinder end 56 back into the cylinder end 58 while blocking off the return of fluid to the reservoir 13. In the other direction of steering, however, the circumferential grooves perform the function of directing the pressurized fluid from the pump 12 to the reduced cross-sectional area end cylinder 56 and of directing all of the fluid being expelled from the enlarged end 58 back to the reservoir 13. The arrangement of the circumferential grooves simplifies the construction and design as well as the operation of the hydrostatic unit 15.

The system 10 can be operated to control the steering of the dirigible wheels even during periods of inoperativeness of the pump 12 due to failure of the pump itself or shut down of the engine by which it is driven.

For this purpose a threaded stud 295 having an enlarged head 295a is threaded into a bore 296 formed in the operating shaft 26. The head 295a protrudes out of the bore 296 and into a groove or slot 297 formed in the valve 24.

The circumferential width of the slot 297 in relation to the diameter of the stud head 295a is such that under power steering conditions (when the pump 12 is operative) the operating shaft 26 is able to rotate sufficiently to shift the valve 24 to an operating position before the head 295a of the stud 295 abuts a sidewall of the slot 297.

During manual steering conditions, however, the movement of the valve 24 to an operating position has no effect on the movement of the dirigible wheels since pressurized fluid is not caused thereby to be directed to the cylinder 16.

Upon continued rotation of the operating shaft 26, however, beyond the position at which the valve 24 is caused to shift to an operating position, the stud head 295a engages the sidewall of the slot 297, as a result of which the valve 24, now in an operating position, is driven by the operating shaft 26 for joint rotation therewith.

Rotation of the valve 24 causes the gear assembly 22 to be operated by virtue of rotation of the wobble shaft 32. Operation of the gear assembly 22 causes the fluid to be circulated through the system 10 as though the pump 12 were operating, since the gear assembly 22 now performs the function of a fluid pump rather than a fluid meter, the function which it performs under power steering conditions.

The level of steering effort which must be applied to the operating shaft 26 of course increases under manual steering conditions since all of the work involved in operating the gear assembly 22 as a fluid pump must necessarily be applied by the operator of the vehicle to the operating shaft 26.

We claim:

1. A power steering system comprising:
   a work cylinder having a free cross-sectional area on one side of the piston thereof equal to twice that on the other side,
   means forming first and second cylinder ports at the ends of said work cylinder, and
a one-piece hydrostatic unit comprising:
   a housing having first and second cylinder ports for connection to the first and second cylinder ports of said work cylinder,
   a main fluid inlet and a main fluid outlet port, a fluid pump-meter gear assembly including a rotatable gear, a cylindrical bore, an axially shiftable directional control sleeve valve in said bore, a rotatable manually operated control shaft, means for interconnecting said sleeve valve and said control shaft for shifting said sleeve valve axially in opposite directions from a neutral position to first and second operating positions in response to rotation of said control shaft in opposite directions, followup means for connecting said rotatable gear and said sleeve valve for joint rotation and fluid passage means including a series of axially spaced cooperating lands and grooves formed in the wall of said bore and in said sleeve valve for interconnecting said ports, said gear assembly and said bore,
   said fluid passage means being constructed and arranged so that in said first operating position of said sleeve valve said fluid inlet port, said gear assembly and said first and second cylinder ports are interconnected and said fluid outlet port is blocked whereby the pressure of fluid is balanced on both sides of said work cylinder and so that in the second operating position of said sleeve valve said fluid inlet port, said gear assembly and said second cylinder ports are connected in series with one another and said first cylinder ports and said fluid outlet port are connected in series with one another.

2. The invention as defined in claim 1 wherein said fluid passage means is further constructed and arranged to communicate said fluid inlet port and said fluid outlet port in the neutral position of said sleeve valve.

3. The invention as defined in claim 1 wherein said sleeve valve comprises a hollow cylindrical wall and a pair of axially spaced radial passages extending through said cylinder wall and communicating respectively with said first and second cylinder ports in said first operating position of said sleeve valve to interconnect said first and second cylinder ports through the hollow of said sleeve valve.

4. The invention as defined in claim 1 wherein said sleeve valve comprises a hollow cylindrical wall and a pair of axially spaced radial passages extending through said cylindrical wall, at least one of said radial passages communicating with said fluid inlet port in said second operating position of said sleeve valve for delivering fluid from said fluid inlet port to said gear assembly through the hollow of said sleeve valve.

5. For use in a single hydraulic cylinder power steering system,
   a one-piece hydrostatic unit comprising:
   a housing having a fluid inlet port, a fluid outlet port and means forming
   a bore wall therein,
   a fluid meter-pump assembly in said housing,
   a directional control hollow sleeve fluid valve carried in said bore and shiftable axially in opposite directions from a neutral position to first and second operating positions disposed respectively on opposite sides of said neutral position,
   means forming, in order, first, second, third, fourth, fifth, sixth, seventh and eighth axially spaced grooves in said bore wall and, in corresponding order, first, second, third and fourth axially spaced grooves in the periphery of said sleeve valve,
   means forming a pair of axially spaced flow passages extending radially through the wall of said sleeve valve and disposed respectively between said first and third and said third and fourth sleeve valve grooves,
   means in said housing communicating said first and said seventh bore wall grooves with said fluid inlet port and said fourth and eighth bore wall grooves with said fluid outlet port,
   said bore wall grooves, said sleeve valve grooves and said radial flow passages being constructed and arranged so that in the neutral position thereof said sleeve valve establishes fluid communication through said bore between said seventh and eighth bore wall grooves and blocks fluid communication between the remaining bore wall grooves, in said first operating position thereof establishes fluid communication through said bore between said first and second bore wall grooves and between said third and sixth bore wall grooves and blocks communication between the remaining bore wall grooves and in said second operating position thereof establishes fluid communication through said bore between said second and third bore wall grooves and between said fourth, fifth and sixth bore wall grooves and blocks communication between the remaining bore wall grooves.

6. The invention as defined in claim 5 wherein said fourth sleeve valve groove communicates said seventh and eighth bore wall grooves in said neutral position of said sleeve valve.

7. The invention as defined in claim 5 wherein, in said first operating position of said sleeve valve, said first sleeve valve groove communicates said first and second bore wall grooves and said radial flow passages in said sleeve valve communicate respectively with said third and sixth bore wall grooves.

8. The invention as defined in claim 5 wherein, in said second operating position of said sleeve valve, said first sleeve valve groove communicates said second and third bore wall grooves, said second and third sleeve valve grooves communicate said fourth, fifth and sixth bore wall grooves and one of said radial flow passages in said sleeve valve communicates with said seventh bore wall groove.

9. A power steering system comprising a main fluid pump assembly, a single work cylinder having a piston rod extending from only one side of the piston thereof and a manually operated hydrostatic unit for controlling the flow of fluid between the main fluid pump assembly and the opposite ends of the work cylinder, said hydrostatic unit including means forming a cylindrical bore wall having a series of axially spaced circumferential grooves formed therein, an axially shiftable sleeve valve carried in said bore and having a series of axially spaced cooperating circumferential grooves formed in the outer wall thereof, a rotatable control shaft and mechanical means interconnecting said sleeve valve and said control shaft for providing relative axial movement therebetween upon relative rotation thereof, said valve being shiftable from a neutral position, at which fluid flow from the pump assembly is blocked, to a pair of operating positions located respectively on opposite sides of said neutral position, said circumferential grooves in said bore wall and in said valve being effective in one of said operating positions to communicate the high pressure side of the pump assembly with both ends of the work cylinder and being effective in the other operating position to communicate only that end of the work cylinder which houses the piston rod with the high pressure side of the pump assembly and to communicate the other end of the work cylinder with the low pressure side of the pump assembly.

10. The invention as defined in claim 9 wherein said circumferential grooves in said bore wall and in said valve are constructed and arranged to communicate the high pressure and low pressure sides of said pump assembly in the neutral position of said valve.